United States Patent Office 3,432,576
Patented Mar. 11, 1969

3,432,576
GRAFT COPOLYMERS PREPARED BY POLYMERIZING VINYL CHLORIDE IN THE PRESENCE OF VINYL ACETATE POLYMERS
Ludwig A. Beer, Agawam, Mass., assignor to Monsanto Company, St. Louis, Mo., a corporation of Delaware
No Drawing. Filed Sept. 16, 1964, Ser. No. 397,021
U.S. Cl. 260—878          4 Claims
Int. Cl. C08f 15/40

ABSTRACT OF THE DISCLOSURE

A graft blend is prepared by polymerizing a vinyl halide formulation having dispersed therein a copolymer of vinyl acetate and octyl acrylate containing at least 50 percent by weight of vinyl acetate.

---

This invention relates generally to vinyl chloride graft copolymer compositions and more specifically to thermoplastic reaction products of vinyl acetate homopolymers or copolymers and vinyl chloride.

Interpolymers of vinyl chloride and vinyl acetate or terpolymers of the two with other copolymerizable monomers are characterized by being mixed single chain polymers in which vinyl chloride groups are linked with linearly recurring units or groups of the comonomers. In order to achieve a desired composition homogeneity and molecular weight of these interpolymers, it is necessary that polymerization be carried out under specifically defined conditions of temperature and monomer addition rate, depending upon the reactivity of the individual monomers.

Mechanical blends of vinyl acetate polymers or copolymers with polyvinyl chloride resins lack homogeneity due to incompatibility of the two polymers, as evidenced by brittleness and opacity of articles molded from such mixtures. Moreover, these non-homogeneous blends are rapidly attacked by solvents which may not affect the polyvinyl chloride substituent but in which the polyvinyl acetate polymers are soluble.

The polymers obtained in accordance with the practice of this invention are polymers wherein the essentially linear chains of a polyvinyl acetate polymer or copolymer are preserved substantially intact and modified by random attachments of side chains of vinyl chloride groups. The modified polymer retains much of the original properties of the polyvinyl acetate polymers but also exhibits properties unobtainable from mechanical blends or from polymers obtained by copolymerizing vinyl chloride with vinyl acetate or mixtures of vinyl acetate and minor proportions of other copolymerizable monomers.

It is therefore an object of this invention to provide improved thermoplastic reaction products of vinyl acetate homopolymers or copolymers and vinyl chloride.

It is a further object of this invention to provide improved vinyl chloride graft copolymer compositions which satisfy complex use requirements and exhibit properties far beyond the range of those ordinarily associated with conventional polyvinyl acetate polymers.

It is a still further object of this invention to provide rigid and semi-rigid vinyl chloride polymer compositions exhibiting improved physical properties over mechanical blends of vinyl chloride polymers with vinyl acetate homopolymers and copolymers.

Each of the above objects has been realized through the development of a novel polymeric composition differing in properties from mechanical blends or copolymers, obtained by polymerizing vinyl chloride in the presence of preformed polyvinyl acetate or vinyl acetate copolymers. The solubility characteristics and increased compatibility of the resins indicate that part of the vinyl chloride combines chemically as side chains with a portion of the vinyl acetate polymer.

The graft polyblend resins can be prepared by polymerizing vinyl chloride in mass, solution or suspension in the presence of the preformed vinyl acetate polymer and with the aid of a monomer soluble, peroxide initiator sufficiently active at the selected polymerization temperature. Novel vinyl chloride-polyvinyl acetate composition ratios not attainable by copolymerization are achieved, for example, by selecting a polyvinyl acetate polymer of high molecular weight as backbone and polymerizing vinyl chloride at temperatures sufficient to yield short vinyl chloride branches and polyvinyl chloride homopolymer of low molecular weight. Correspondingly, selecting a polyvinyl acetate polymer of low molecular weight and polymizing at lower temperatures yields longer vinyl chloride branches and polyvinyl chloride homopolymer of high molecular weight.

The degree of grafting or grafting efficiency is determined and influenced by the molecular weight of the backbone polymer, the polymer/monomer ratio, presence of solvents or chain transfer agents and polymerization temperature.

The graft resins retain, at least in part, the reactivity of the backbone polymer and, where polyvinyl acetate as utilized as the backbone, the graft resin may be converted to a polyvinyl chloride/polyvinyl alcohol graft resin by hydrolysis or alcoholysis. Such a graft resin cannot be obtained in the practice of this invention directly from polyvinyl alcohol due to the insolubility of the polymer in vinyl chloride monomer.

Although polyvinyl acetate is preferred as a backbone material, this invention is not restricted to the use of rigid polyvinyl acetate polymers as backbone for vinyl chloride grafting. Other vinyl ester polymers such as vinyl formate, propionate, chloroacetate, benzoate, laurate, mixtures and copolymers thereof, or their partial hydrolysis products which are soluble in vinyl chloride, may be used in the practice of this invention.

Graft polyblends of improved impact resistance can be obtained by selecting a flexible vinyl acetate copolymer with more than 50% vinyl acetate as backbone, such as a vinyl acetate/octyl acrylate or vinyl acetate/ethylene copolymer.

The vinyl acetate homopolymers or copolymers may be prepared by mass, suspension, solution or emulsion polymerization using conventional polymerization techniques.

Although peroxidic, monomer soluble initiators such as acetyl cyclohexane persulfonate, diisopropyl percarbonate, lauroyl peroxide or benzoyl peroxide are preferred, graft polymerization may also be carried out by means of heat or irradiation.

The ethylenically unsaturated monomers useful in preparing the graft polyblends are those consisting of at least 80% of vinyl chloride with up to 20% of other ethylenically unsaturated monomers copolymerizable therewith, such as vinylidene chloride, vinyl esters of organic acids, acrylonitrile, acrylates, methacrylates, maleates, fumarates, ethylene, propylene, vinyl fluoride, vinyl bromide, divinyl benzene, divinyl phthalate, diallyl maleate, and other unsaturated organic compounds.

The graft polymer blends formed in the practice of the present invention are those wherein 1–50 parts by weight of polyvinyl acetate homopolymer or copolymers with more than 50% vinyl acetate are graft polymerized with 50–99 parts by weight of vinyl chloride or a copolymerizable monomer mixture containing more than 80% vinyl chloride.

The following examples are given to illustrate the invention and are not intended as limitations thereof:

EXAMPLE I

A solution of 10 parts polyvinyl acetate, having a specific viscosity of 0.607 (0.42% solution in cyclohexanone at 25° C.), in 315 parts ethylacetate is charged to a jacketed, cylindrical reactor with an L/D ratio of 8. The solution is saturated at 20° C. and atmospheric pressure by the addition of vinyl chloride gas through a sparger at the bottom of the reactor.

After equilibrium is reached (67 parts by weight of vinyl chloride), 0.0068 mole per liter of acetyl cyclohexane persulfonate are added and the vinyl chloride monomer addition rate is adjusted to a slight volume of off-gas.

After polymerizing at 30° C. and at atmospheric pressure for 6 hours, the reaction is terminated by discontinuing vinyl chloride addition and flushing the reactor with nitrogen. The clear, viscous solution is drained and diluted with ethyl acetate and the resin is precipitated by the addition of n-hexane. 26.5 parts of a white, powdery resin, having a specific viscosity of 0.768, are obtained. The precipitated resin is extracted with hot methanol.

Infrared spectrum analysis and specific viscosity determination (0.590) of the resin establish that 1.3 parts or 13% of the original polyvinyl acetate are recovered as unconverted polymer. The methanol insoluble portion has a specific viscosity of 0.319 and contains 65.5% polyvinyl chloride, as determined by chlorine analysis.

A polyvinyl chloride resin polymerized at the same conditions, but in the absence of polyvinyl acetate has a specific viscosity of 0.256 and also remains in solution during polymerization.

A physical, co-precipitated blend of this polyvinyl chloride resin and the polyvinyl acetate resin utilized for grafting can be completely separated into the individual components by extraction with methanol.

EXAMPLE II

Example I is repeated using a solution of 35 parts polyvinyl acetate with a specific viscosity of 0.328 in 288 parts ethyl acetate. At the conditions of this experiment, the ratio of polyvinyl acetate to vinyl chloride is 1:2, as compared to 1:6.9 in Example I.

After polymerization for 6 hours at 30° C. and under atmospheric pressure, 50 parts of resin are precipitated, from which 45% of the initial polyvinyl acetate charge can be extracted with hot methanol.

The insoluble resin has a specific viscosity of 0.301 and a polyvinyl chloride content of 43.9%, as determined by chlorine analysis.

EXAMPLE III 10 parts of polyvinyl acetate resin (specific viscosity 0.607), 100 parts of vinyl chloride and 24 parts of lauroyl peroxide are charged to a pressure reactor. After agitation for 1 hour at 25° C., the temperature is raised to 60° C. and polymerization is carried out in separate batches for 1, 2 and 3 hours, after which time the residual monomer is vented off. The resin is dissolved in tetrahydrofurane and precipitated with water.

The precipitated, dry resin is extracted with hot methanol to remove unconverted polyvinyl acetate.

The results for the 3 batches are as follows:

| Polymerization time, hours | Percent VCM conversion | Percent of PVAc extractible | Percent PVAc in graft resin after extraction |
|---|---|---|---|
| 1 | 5.9 | 90.4 | 14.0 |
| 2 | 18.8 | 70.1 | 13.7 |
| 3 | 33.2 | 48.0 | 13.5 |

EXAMPLE IV 30 parts of a solution of a polyvinyl acetate resin with a viscosity of 95 centipoises (benzene solution containing 86 grams of resin per 1000 ml. of solution at 20° C.) in vinyl chloride at concentrations indicated below are charged to a jacketed pressure reactor equipped with an agitator and containing 48 parts water, 0.14 parts of methyl hydroxypropyl cellulose as suspending agent and 0.3 weight percent based on vinyl chloride, of lauroyl peroxide as initiator.

Polymerization is carried out at 60° C. for 6 hours and the granular resin is recovered by filtration. Samples of the dry resins are extracted with hot methanol in a Soxhlet extractor to determine the amount of unreacted polyvinyl acetate.

The results for the individual batches are presented below:

| PVAc/VCM ratio in charge | Percent VCM conversion | Percent of PVAc extractible | Percent PVAc in graft resin |
|---|---|---|---|
| 2:1 | 49.0 | 58 | 63.0 |
| 1:1 | 65.3 | 47 | 44.8 |
| 1:2 | 82.0 | 38 | 27.4 |
| 1:4 | 84.4 | 24 | 15.2 |

1% solutions in tetrahydrofurane were prepared for each of the following:

1. A polyvinyl acetate homopolymer resin
2. A polyvinyl chloride homopolymer resin
3. A vinyl chloride/vinyl acetate copolymer resin (86/14) and
4. The methanol extracted graft resins containing 15.2% and 44.8% PVAc.

Solubility parameters (gamma values*) for these resins with various precipitants were found to be as follows:

| Precipitant | Resin (specific viscosity) | | | | |
|---|---|---|---|---|---|
| | PVC | PVAc | PVC/VAc copolymers (86/14) | Extracted graft containing | |
| | | | | 15.2% PVAc | 44.8% PVAc |
| | (0.49) | (.607) | (.250) | (.42) | (.48) |
| Methanol | .51–53 | (¹) | .55–58 | .56 | (¹) |
| n-Hexane | .56–58 | .39–.40 | .56 | .55 | .48 |

¹ No precipitation.

A physical blend of a PVC and a PVAc resin can be separated from THF solution by precipitation with methanol.

As distinguished from a physical blend, extracted graft resins yield transparent and homogeneous films upon thermal processing or cast from solution.

Acid and alkali catalyzed alcoholysis of the graft resins in homogeneous and heterogeneous systems yielded products in which all or part of the acetate groups were converted into hydroxyl groups, as established by infrared analysis, solubility parameters, and determination of hydroxyl groups.

EXAMPLE V 29.4 parts of a polyvinyl acetate/octyl acrylate copolymer (70/30) latex having a solids content of 54.5% are charged to a pressure vessel together with 220 parts of water, 0.32 part hydroxypropyl methyl cellulose and 0.39 part lauroyl peroxide.

After essential removal of oxygen from the reactor, 155 parts of vinyl chloride are added and the temperature is raised to 50° C.

Polymerization is carried out at this temperature under agitation for 16 hours. After venting off small quantities of unconverted monomer, 160 parts of a homogeneous

* $\left( \text{Gamma} = \frac{\text{ml. precipitant}}{\text{ml. solvent} + \text{ml. precipitant}} \right)$ granular resin are obtained upon washing and drying by conventional techniques. The dry resin passes 100% through a 40 mesh screen and has a specific viscosity of 0.54 (0.42% solution by weight in cyclohexanone).

Polymerization is repeated at the same conditions with a charge of 44.1 parts of the vinyl acetate/octyl acrylate (70/30) copolymer latex equivalent to 24 parts of solid resin and 143 parts vinyl chloride.

2 p.p.h. of tin stabilizer and .5 p.p.h. of lubricant are added to the resins and the resins are milled on a 2 roll mill at 165° C. for 5 minutes. Test samples (5" x ½" x ⅛") are molded in a press at 175° C. and 3000 p.s.i. from selected stock prepared from the two resins and from a physical blend of a PVC homopolymer resin having a specific viscosity of 0.52 and the vinyl acetate/octyl acrylate copolymer isolated from the latex in the ratio of 90:10.

The graft blends are highly transparent and tough, as distinguished from the physical blend which yields opaque and inhomogeneous sheets. Comparative tests were made to determine the notched impact strength of the samples, with the following results:

Izod impact, ft. lbs./in.
(ASTM–D256–56)
Physical blend, 90/10 _____ 0.97
Graft blends:
  90/10 _____ 1.8
  85/15 _____ 2.6

EXAMPLE VI

Ten parts of a vinyl acetate/ethylene copolymer (76% vinyl acetate, melt index=110, specific viscosity 0.253) are dissolved in 100 parts vinyl chloride. The solution is charged to a polymerization vessel containing 160 parts of water, 0.30 part of methyl hydroxypropyl cellulose suspending agent (5.5–7.0 hydroxypropyl, 22–23% methoxyl content, viscosity of 2% aqueous solution at 20° C.=100 centipoises) and 0.15 part of lauroyl peroxide as polymerization initiator.

108 parts of a homogeneous, granular resin are obtained after polymerizing for 8 hours at 60° C. The dry resin has a specific viscosity of 0.456 (0.40 grams of resin in 100 ml. cyclohexanone at 25° C.). In comparison to a physical resin mixture obtained by solvation and co-precipitation of a vinyl chloride homopolymer and a vinyl acetate/ethylene copolymer in the same proportions, from which 100% of the vinyl acetate copolymer can be separated, only 14% of the charged vinyl acetate/ethylene copolymer can be extracted with hot cyclohexane from the graft resin.

2 parts of tin stabilizer were added to the resin and the composition was fused at 165° C. on a 2 roll mill. Test samples were molded in a press from the milled sheet at 175° C. and 3000 p.s.i. for 5 minutes, the test results of which are shown below:

EXAMPLE VII 10 parts of a vinyl acetate/ethylene copolymer containing 53.8% vinyl acetate and having a specific viscosity of 0.302 are dissolved in 100 parts of vinyl chloride and the solution is charged to a pressure reactor containing 160 parts of water, and 0.25 part of polyvinyl alcohol (82% hydrolyzed, viscosity of 4% aqueous solution at 20° C.=60 centipoises) at 25° C.

0.04% of diisopropyl percarbonate based on monomer weight is added as a 25% solution in diethyl maleate. Agitation is begun and the temperature is raised to 50° C. After polymerizing at 50° C. for 12 hours and venting of residual vinyl chloride, 108 parts of a homogeneous, granular suspension resin having a specific viscosity of 0.627 are obtained. Only 12.4% of the originally added vinyl acetate copolymer are extractable with hot cyclohexane from the dry resin, in comparison to 100% for a physical blend of a PVC homopolymer resin and the vinyl acetate copolymer in the same proportion. Test samples prepared from the resins in Examples 6 and 7 exhibit the following physical properties:

| Property tested | Resin samples | |
| --- | --- | --- |
| | Example 6 | Example 7 |
| Ultimate tensile stress, p.s.i. (ASTM D-628-58) | 7,570 | 6,850 |
| Ultimate total elongation, percent (ASTM D-628-58) | 120 | 116 |
| Ultimate tensile modulus, p.s.i. (ASTM D-628-58) | 321,000 | 297,000 |
| Izod impact strength, ft. lbs./in. of notch (ASTM D-256-56) | 2.3 | 12.6 |
| Rockwell hardness (ASTM D-785-51) | 114 | 102 |
| Heat distortion, ° C. at 264 p.s.i. (ASTM D-648-56) | 55 | 62 |

As indicated previously, graft polymer blends formed in the practice of the present invention are those wherein 1–50 parts by weight of polyvinyl acetate homopolymer or copolymer having a vinyl acetate content of 50% or greater, is graft polymerized with 50–99 parts by weight of vinyl chloride monomer. The vinyl chloride monomer used in effecting graft polymerization may include up to 20% of other ethylenically unsaturated monomers copolymerizable therewith, such as vinylidene chloride, vinyl esters of organic acids, acrylonitrile, acrylates, methacrylates, maleates, fumarates, and other unsaturated organic compounds.

The graft blends formed in the practice of this invention may be physically blended with other compatible polymer compositions. A preferred composition for the formation of high or medium impact material that can be extruded or calendered at relatively high rates to give products of excellent quality is one wherein 40–100% by weight of the graft blend is physically admixed with 1–60% by weight of polyvinyl chloride homopolymer, with possible adjuncts of up to 0–10% by weight of other compatible polymers.

The quantity of catalyst will generally be varied depending upon initiator activity, and on the quantity of monomer and diluent. Additionally, process variables such as temperature, pressure, polymerization cycles, etc., may be varied over wide ranges. Generally, polymerization temperatures will range between 30° C. to 60° C., while pressures may vary between atmospheric pressure and 150 p.s.i.g.

Optional additives, such as stabilizers, fillers, colorants, processing aids, lubricants, co-plasticizers, etc., can be incorporated into the polyblends if desired.

Among the processing aids and co-plasticizers useful for incorporation into the polyblends are methyl methacrylate polymers, styrene-acrylonitrile copolymers, styrene-methyl methacrylate copolymers, epoxy compounds, chlorinated paraffins, etc.

Liquid plasticizers which are useful in certain of the compositions include phosphate esters such as tricresyl phosphate and tri(2-ethyl hexyl) phosphate, phthalate esters such as di-2-ethyl hexyl and di-tridecyl phthalate, tetrahydro- and hexahydrophthalate esters, adipates such as di-n-octyl and n-octyl-n-decyl adipate, azelaic esters such as di-2-ethyl hexyl sebacate, trimellitate esters, epoxidized soybean oil, epoxidized tall oil, di-epoxidized linseed oil and epoxy stearate plasticizers, complex linear polyesters and polymeric plasticizers, certain citric, acetyl citric, tartaric and ricinoleic acid esters, certain glycol glycerol and penta-erythritol esters of fatty acids, and so forth.

The particular combination of primary ingredients and additives in commercially useful compositions within the range of this invention depends on the specific combination of end-use requirements and is varied from one application to another to achieve the optimum overall cost-performance ratio.

Typical applications for the products of this invention include rigid and semi-rigid sheets, tubes, and molded objects requiring an optimum balance of high impact and tensile strength, together with good flow properties at relatively low processing temperatures, high heat distortion point, and excellent chemical and solvent resistance. These latter properties together with high resistance to ultraviolet radiation make the products of this invention excellent for outdoor applications such as corrugated and flat roofing, siding, etc. Hardness, rigidity, dimensional stability, heat resistance, toughness, elongation and tear strength may readily be adjusted over the range associated with rigid, semi-rigid, and flexible thermoplastic materials by varying the proportions of liquid plasticizer, fillers, etc., if used. Processing temperatures for the compositions herein described are such that no significant degradation occurs during the overall manufacturing process.

While in the foregoing specification, specific compositions and steps have been set out in considerable detail for the purpose of illustrating the invention, it will be understood that such details of composition and procedure may be varied widely by those skilled in the art without departing from the spirit of this invention.

What is claimed is:

1. A graft blend prepared by polymerizing 50–99 parts by weight of vinyl chloride with 1–50 parts by weight of a preformed copolymer of vinyl acetate and octyl acrylate, said octyl acrylate comprising 10–50 percent by weight of said copolymer.

2. A graft blend prepared by polymerizing 50–99 parts by weight of monomeric material with 1–50 parts by weight of a preformed copolymer of vinyl acetate and octyl acrylate containing 10–50 percent by weight octyl acrylate, said monomeric material comprising 80–100 percent by weight of vinyl chloride and 20–0 percent by weight of other ethylenically unsaturated monomers copolymerizable therewith selected from the class consisting of vinylidene chloride, vinyl esters of organic acids, acrylonitrile, acrylates, methacrylates, maleates, fumarates, ethylene, propylene, vinyl halides, divinyl benzene, divinyl phthalate and diallyl maleate.

3. The graft blend in accordance with claim 2 wherein at least a portion of the vinyl acetate groups in the copolymer have been converted to vinyl alcohol groups by a process selected from the group consisting of hydrolysis and alcoholysis.

4. A process for preparing a graft blend comprising: dissolving in monomeric vinyl chloride a preformed copolymer of vinyl acetate and octyl acrylate containing 10–50 percent by weight octyl acrylate, said monomeric material comprising 50–99 parts by weight and said copolymer comprising 1–50 parts by weight, polymerizing the mixture, and subjecting the blend to a subsequent treatment consisting of hydrolysis or alcoholysis to convert at least a portion of the vinyl acetate groups to vinyl alcohol groups.

References Cited

UNITED STATES PATENTS

| | | | |
|---|---|---|---|
| 2,947,719 | 8/1960 | Rugg et al | 260—878 |
| 3,162,696 | 12/1964 | Zimmerman et al. | 260—878 |
| 3,218,373 | 11/1965 | Salyer | 260—878 |
| 2,816,087 | 12/1957 | Coover | 260—884 |
| 2,921,044 | 1/1960 | Coover | 260—884 |
| 3,037,948 | 6/1962 | Lander et al | 260—876 |
| 3,189,664 | 6/1965 | Nazaki | 260—884 |
| 3,334,156 | 8/1967 | Calentine et al. | 260—884 |
| 3,358,054 | 12/1967 | Hardt et al. | 260—878 |

FOREIGN PATENTS 814,393   6/1959   Great Britain.

OTHER REFERENCES

Derwent Belgian Patents, Report Nos. 33, 34, 35, 64 Reports Belgian Patent No. 643,626 QPI 17–23 August 1964 2 pages.

MURRAY TILLMAN, *Primary Examiner.*

M. J. TULLY, *Assistant Examiner.*

U.S. Cl. X.R.

260—23, 28.5, 33.8, 876, 881, 884, 899